United States Patent
Yang et al.

(10) Patent No.: US 10,029,730 B2
(45) Date of Patent: Jul. 24, 2018

(54) PARKING ASSIST SYSTEM AND METHOD FOR SETTING PARKING COMPLETE CRITERION OF PARKING ASSIST SYSTEM

(71) Applicant: HYUNDAI MOTOR COMPANY, Seoul (KR)

(72) Inventors: Dong Hun Yang, Anyang-si (KR); Jin Ho Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 96 days.

(21) Appl. No.: 15/135,056

(22) Filed: Apr. 21, 2016

(65) Prior Publication Data
US 2017/0096168 A1   Apr. 6, 2017

(30) Foreign Application Priority Data
Oct. 5, 2015   (KR) .................... 10-2015-0139877

(51) Int. Cl.
*B62D 15/02*   (2006.01)
*G08G 1/14*   (2006.01)
*B60W 40/08*   (2012.01)

(52) U.S. Cl.
CPC ....... *B62D 15/0285* (2013.01); *B62D 15/027* (2013.01); *G08G 1/14* (2013.01); *G08G 1/143* (2013.01); *B60W 40/08* (2013.01); *B60W 2040/0881* (2013.01)

(58) Field of Classification Search
CPC .............. B62D 15/0285; B60W 40/08; B60W 2040/0881; G08G 1/14
See application file for complete search history.

(56) References Cited

U.S. PATENT DOCUMENTS

| | | | |
|---|---|---|---|
| 8,374,749 | B2 | 2/2013 | Tanaka |
| 8,744,684 | B2 | 6/2014 | Hong et al. |
| 2010/0049402 | A1 | 2/2010 | Tanaka |
| 2013/0085640 | A1 | 4/2013 | Hong et al. |
| 2016/0284217 | A1* | 9/2016 | Lee .................. G08G 1/143 |

FOREIGN PATENT DOCUMENTS

| | | |
|---|---|---|
| JP | 2004-142659 A | 5/2004 |
| JP | 2008-279875 A | 11/2008 |
| JP | 2008-284969 A | 11/2008 |
| JP | 2008-296639 A | 12/2008 |
| JP | 2009-166612 A | 7/2009 |
| JP | 2009-169486 A | 7/2009 |
| JP | 2009-190560 A | 8/2009 |
| JP | 2009-202610 A | 9/2009 |
| JP | 2013-079048 A | 5/2013 |

(Continued)

*Primary Examiner* — Michael Dean Lang
(74) *Attorney, Agent, or Firm* — McDermott Will & Emery LLP

(57) ABSTRACT

A parking assist system includes a parking slot searcher for searching a parking slot around a vehicle and obtaining parking environment information, a driver sensor for sensing a driver in the vehicle and obtaining driver information, a fellow passenger sensor for sensing a fellow passenger in the vehicle and obtaining fellow passenger information, and a controller for setting a parking complete criterion based on one or more of the parking environment information, the driver information and the fellow passenger information.

18 Claims, 6 Drawing Sheets

(56) References Cited

FOREIGN PATENT DOCUMENTS

| | | |
|---|---|---|
| JP | 5365349 B2 | 12/2013 |
| JP | 2014-125196 A | 7/2014 |
| JP | 2015-084253 A | 4/2015 |
| KR | 10-1305630 B1 | 9/2013 |
| KR | 10-2014-0082390 A | 7/2014 |
| KR | 10-2015-0061422 A | 6/2015 |

* cited by examiner

PARKING ASSIST SYSTEM AND METHOD FOR SETTING PARKING COMPLETE CRITERION OF PARKING ASSIST SYSTEM

CROSS-REFERENCE TO RELATED APPLICATION

This application claims the benefit of priority to Korean Patent Application No. 10-2015-0139877, filed on Oct. 5, 2015 with the Korean Intellectual Property Office, the disclosure of which is incorporated herein in its entirety by reference.

TECHNICAL FIELD

The present disclosure relates to a parking assist system that sets a driver customized parking complete criterion by taking account of a parking style of a driver, and a method for setting a parking complete criterion of the parking assist system.

BACKGROUND

A smart parking assist system (SPAS) is a convenience system that searches a parking slot, or spot or space, and generates an optimal parking trajectory based on the searched parking spot to automatically assist steering, thereby assisting a driver at the time of parking.

The smart parking assist system according to the related art sets a center line in a length direction of the searched parking slot as a parking complete criterion, and follows the set center line. A parking trajectory following the center line of the searched parking slot is an optimal parking trajectory in the smart parking assist system, but may not be the optimal parking trajectory for the driver, which is an actual user.

As such, since the related art does not take account of a parking style of the driver, it may degrade convenience and satisfaction of the driver.

SUMMARY

The present disclosure has been made to solve the above-mentioned problems occurring in the prior art while advantages achieved by the prior art are maintained intact.

An aspect of the present disclosure provides a parking assist system that sets a driver customized parking complete criterion by taking account of a parking style of a driver, and a method for setting a parking complete criterion thereof.

According to an exemplary embodiment of the present disclosure, a parking assist system includes a parking slot searcher configured to search a parking slot around a vehicle and obtain parking environment information; a driver sensor configured to sense a driver in the vehicle and obtain driver information; a fellow passenger sensor configured to sense a fellow passenger in the vehicle and obtain fellow passenger information; and a controller configured to set a parking complete criterion based on one or more of the parking environment information, the driver information, and the fellow passenger information.

The parking slot searcher may include one or more distance sensors installed at the front, the rear, and the side of the vehicle, respectively.

The parking environment information may include any one or more of an area and width of the parking slot, whether or not there is a pillar and an interval between neighboring parked vehicles.

The driver sensor may include any one or more of a pressure sensor, a driver seat position sensor, a steering wheel position sensor and an image sensor.

The driver information may include body type information including gender, weight, and height of the driver, and propensity information including a parking pattern preferred by the driver.

The fellow passenger sensor may include any one or more of a pressure sensor, a sensor sensing whether or not a hot wire is operated and a sensor sensing whether or not a ventilation sheet is operated.

The fellow passenger information may include whether or not a fellow passenger is riding and a riding position of the fellow passenger.

The controller may set a final parking complete criterion by reflecting a driver offset, a fellow passenger offset and a parking environment offset based on the driver information, the fellow passenger information and the parking environment information to a default parking complete criterion.

The default parking complete criterion may include a parking reference line, a parking alignment and a spaced distance of the center of the vehicle from the parking reference line.

The driver offset may include a body type offset reflected to the parking reference line and a propensity offset reflected to the parking alignment.

The fellow passenger offset may be reflected to the parking reference line and the parking alignment.

The parking environment offset may be reflected to the parking reference line or the spaced distance.

According to another exemplary embodiment of the present disclosure, a method for setting a parking complete criterion of a parking assist system includes generating a parking reference line for a parking slot on which a vehicle is to be parked based on a default parking complete criterion at the time of executing a parking assist function; reflecting an offset based on any one or more information of driver information, fellow passenger information, and parking environment information obtained using a variety of sensors to the default parking complete criterion; and setting the default parking complete criterion to which the offset is reflected as a final parking complete criterion.

The method may further include determining whether or not a parking assist is completed according to the final parking complete criterion, after the final parking complete criterion is set.

The reflecting of the offset may include confirming whether or not a driver who rides the vehicle is an existing driver; if the riding driver is the existing driver, confirming whether or not it is possible to confirm a propensity of the driver; and reflecting a body type offset and a propensity offset based on a parking style information of the driver to the default parking complete criterion.

In the step for confirming whether or not the driver is the existing driver, if the riding driver is not the existing driver, a body type of a new driver may be confirmed and a body type offset thereof may be determined.

In the step for reflecting of the offset, if there is the fellow passenger in the vehicle, a fellow passenger offset based on the fellow passenger information may be reflected to the default parking complete criterion.

In the step for reflecting of the offset, a parking environment offset based on the parking environment information of the parking slot may be reflected to the default parking complete criterion.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Throughout the present specification, since the terms "comprising", "configuring", "having", and the like mean that the corresponding element may be embedded unless explicitly described to the contrary in the present specification, it means the inclusion of other elements rather than the exclusion of any other elements.

In addition, the terms "-er", "-or", "module", and the like described in the present specification mean units for processing at least one function and operation, and can be implemented by hardware, software, or combinations thereof. In addition, articles such as "a", "an", "the", and the like may be used to include both singular forms and plural forms unless the context clearly indicates otherwise, in the context describing the present disclosure.

Hereinafter, exemplary embodiments of the present disclosure will be described in detail with reference to the accompanying drawings.

The present disclosure relates to a parking assist system capable of providing a driver customized parking assist because criteria for determining whether or not parking is completed is set by taking account of a parking style of a driver.

Figure 1:
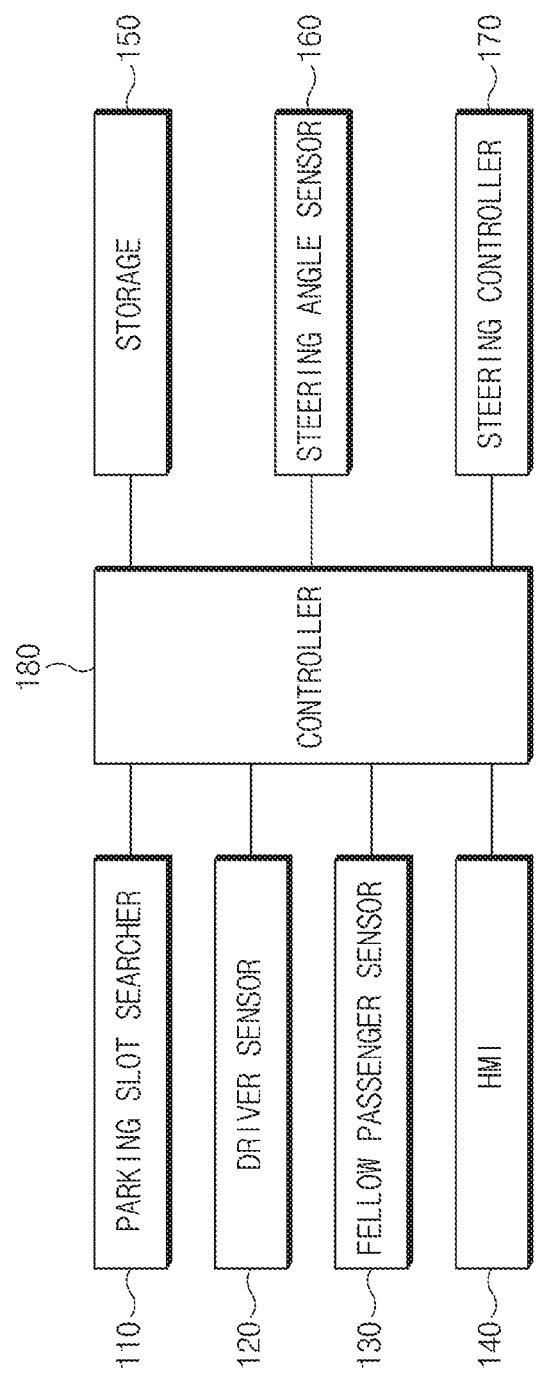
FIG. 1 is a block configuration diagram of a parking assist system according to an exemplary embodiment of the present disclosure.
Figure 2:
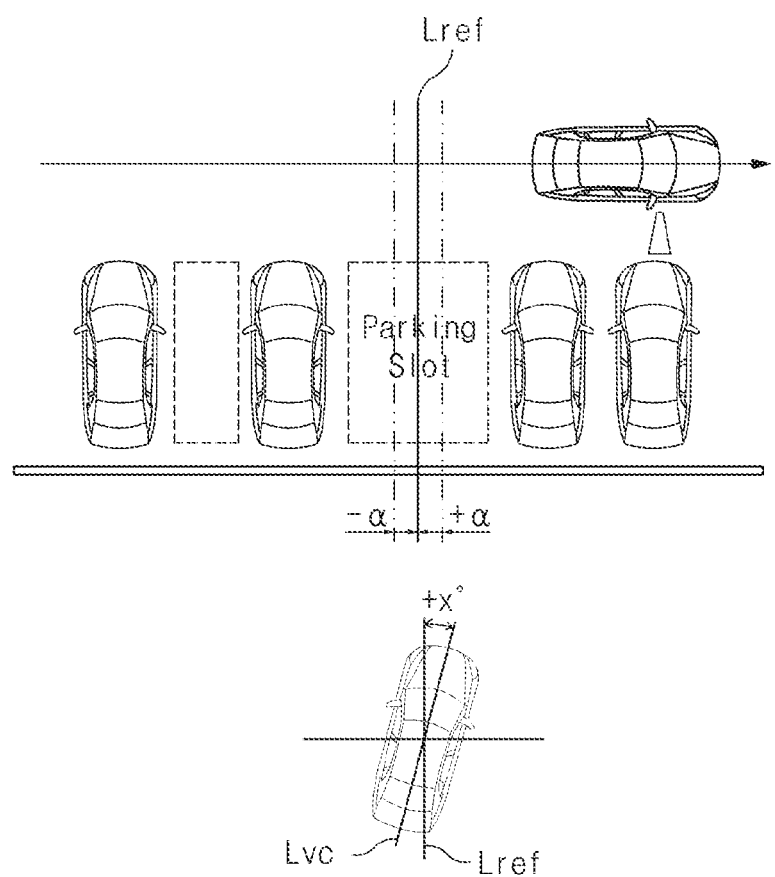
FIG. 2 is a diagram illustrating a default parking complete criterion related to the present disclosure.

FIG. 1 is a block configuration diagram of a parking assist system according to an exemplary embodiment of the present disclosure and FIG. 2 is a diagram illustrating a default parking complete criterion related to the present disclosure.

Referring to FIG. 1, a parking assist system may include a parking slot searcher 110, a driver sensor 120, a fellow passenger sensor 130, a human machine interface (HMI) 140, a storage 150, a steering angle sensor 160, a steering controller 170 and a controller 180.

The parking slot searcher 110 may search a parking slot around a vehicle and obtain parking environment information. Here, the parking environment information may include information such as a length of the parking slot, a width of the parking slot, an area of the parking slot, whether or not there are pillars around the parking slot, an interval between neighboring parked vehicles, and the like.

The parking slot searcher 110 may include one or more distance sensors such as an ultrasonic sensor, radar, lidar, and the like. For example, the parking slot searcher 110 is configured of one or more ultrasonic sensors disposed at the front, the rear, and the side of the vehicle, respectively.

The driver sensor 120 may obtain driver information including information such as a body type and a propensity (a parking preference type) of the driver, and the like. The body type information may include gender (male and female) of the driver, weight (e.g., average, obesity, and slim) of the driver, height (e.g., average, tall stature, and short stature) of the driver, and the like. The propensity information of the driver may be a parking pattern determined based on parking speed, parking alignment, and the like preferred by the driver. The parking pattern may be classified into a fast parking, an accurate parking, a fast and accurate parking, a slow and very accurate parking, and the like.

The driver sensor 120 may sense information such as driver seat pressure, passenger seat pressure, a driver seat position, a steering wheel position, and the like. The driver sensor 120 may include a pressure sensor, a driver seat position sensor, a steering wheel position sensor, an image sensor, and the like.

When the driver directly tries to park the vehicle, the driver sensor 120 may store a parking time taken until the parking is completed, a parking alignment at the time of parking complete, and the like in a database (DB) form. That is, when the driver directly completes the parking, the driver sensor 120 may store parking information in the database to allow the parking assist system to learn a parking style of the driver. The driver sensor 120 may sense the propensity of the driver based on parking style information of the driver.

The driver sensor 120 may determine a preferred parking pattern according to the propensity of the driver. The preferred parking pattern may be classified into a fast parking, an accurate parking, a fast and accurate parking, a slow and very accurate parking, and the like.

The fellow passenger sensor 130 may sense passengers in the vehicle and obtain passenger information. The fellow passenger sensor 130 may obtain whether or not the passenger rides, a riding position (e.g., a passenger seat, a rear seat of the driver seat, a rear seat of the passenger seat, or the like), and the like as the passenger information using sensors mounted on each of the seats. The fellow passenger sensor 130 may include a pressure sensor, a sensor sensing whether or not a hot wire is operated, a sensor sensing whether or not a ventilation sheet is operated, and/or the like.

The human machine interface 140 that interfaces between a user and the parking assist system may include an input means and an output means. The input means may include a switch, a button, a keypad, and the like, and the output means may include a speaker, a cluster, a display, and/or the like.

The human machine interface 140 may transfer input data according to a manipulation of the user (e.g., the driver) to the controller 180, and output a progress situation and a result according to an operation of the controller 180 in a form which may be recognized by the user.

The human machine interface 140 may generate a control command that instructs an execution or a release of a parking assist according to the manipulation of the user. For example, if the driver turns on a parking switch, the human machine interface 140 transmits a control command that instructs activation of a parking assist function to the controller 180.

Further, the human machine interface 140 may output information such as a parking step (e.g., a forward step, a reverse step, and the like) and a driver manipulation guidance for each of the parking steps at the time of parking assist, an operation state of the vehicle, and the like as visual information, tactual information, and/or auditory information.

The storage 150 may store parking style information for each driver, a default parking complete criterion, a program (software) for a parking assist, and the like. The storage 150 may also temporarily store data input and/or output to the parking assist system. In addition, a driver parking style learning DB may also be implemented in the storage 150.

The steering angle sensor 160 may measure a steering angle of the vehicle. Data measured by the steering angle sensor 160 may be used to monitor a change in the steering angle of the vehicle in real time.

The steering controller 170, which may be an actuator for controlling a steering of the vehicle, is implemented as a motor drive power steering (MDPS). Further, the steering controller 170 controls the steering of the vehicle according to a steering wheel manipulation of the driver.

The controller 180 may be connected to the parking slot searcher 110, the driver sensor 120, the fellow passenger sensor 130, the human machine interface 140, the storage 150, the steering angle sensor 160, and the steering controller 170 via a vehicle network. Here, the vehicle network may be implemented as a controller area network (CAN), a media oriented systems transport (MOST) network, a local interconnect network (LIN), X-by-Wire (Flexray), or the like.

The controller 180 may search the parking slot for parking the vehicle using the parking slot searcher 110. In addition, the controller 180 may activate the parking assist function when it is sensed using the human machine interface that the parking switch is turned on after the parking slot search is completed. The controller 180 may perform the parking assist according to a parking mode (e.g., a perpendicular parking, a parallel parking, or the like).

If the parking assist function is performed, the controller 180 may generate a parking reference line based on the default parking complete criterion in order to park the vehicle on the searched parking slot. The parking reference line Lref may be a straight line in a length direction of the parking slot that passes through a half point of a width of the parking slot, as illustrated in FIG. 2. A parking complete determination criterion may be within an allowed spaced distance ±α and within an allowed alignment angle ±x° of a center line Lvc in a length direction of the vehicle in relation to the parking reference line.

The parking reference line may have a position changed according to driver parking style information including driver information (driver offset), fellow passenger information (fellow passenger offset), parking environment information (parking environment offset), and the like. In addition, the allowed spaced distance may be set based on the parking environment offset, and the allowed parking alignment (alignment angle) may be set based on the driver offset, the fellow passenger offset, and the parking environment offset.

If a driver who currently rides in the driver seat is an existing driver after the parking reference line is generated, the controller 180 may obtain body type information on the existing driver stored in the storage 150.

Meanwhile, if the driver who currently rides in the driver seat is a new driver, the controller 180 may sense a body type for the new driver using the driver sensor 120 and apply the sensed body type to the default parking complete criterion. That is, the controller 180 may reflect a body type offset according to the body type information of the new driver to the default parking complete criterion.

If the current driver is the existing driver, the controller 180 may detect (confirm) a propensity of the driver to determine the parking pattern preferred by the driver. The controller 180 may apply a propensity offset according to the preferred parking pattern to the default parking complete criterion.

The controller 180 may apply the parking environment offset according to the parking environment information obtained by the parking slot searcher 110 at the time of searching the parking slot to the default parking complete criterion.

The controller 180 may set a final parking complete criterion by taking account of the driver information, the fellow passenger information and the parking environment information. That is, the controller 180 may set the final parking complete criterion by reflecting the driver offset (the body type offset and the propensity offset), the fellow passenger offset and the parking environment offset to the default parking complete criterion.

The controller 180 may monitor the steering angle of the vehicle using the steering angle sensor 160 and control the steering controller 170 to perform the parking assist. Here, the controller 180 may determine whether or not the parking is completed based on the final parking complete criterion.

Figure 3:
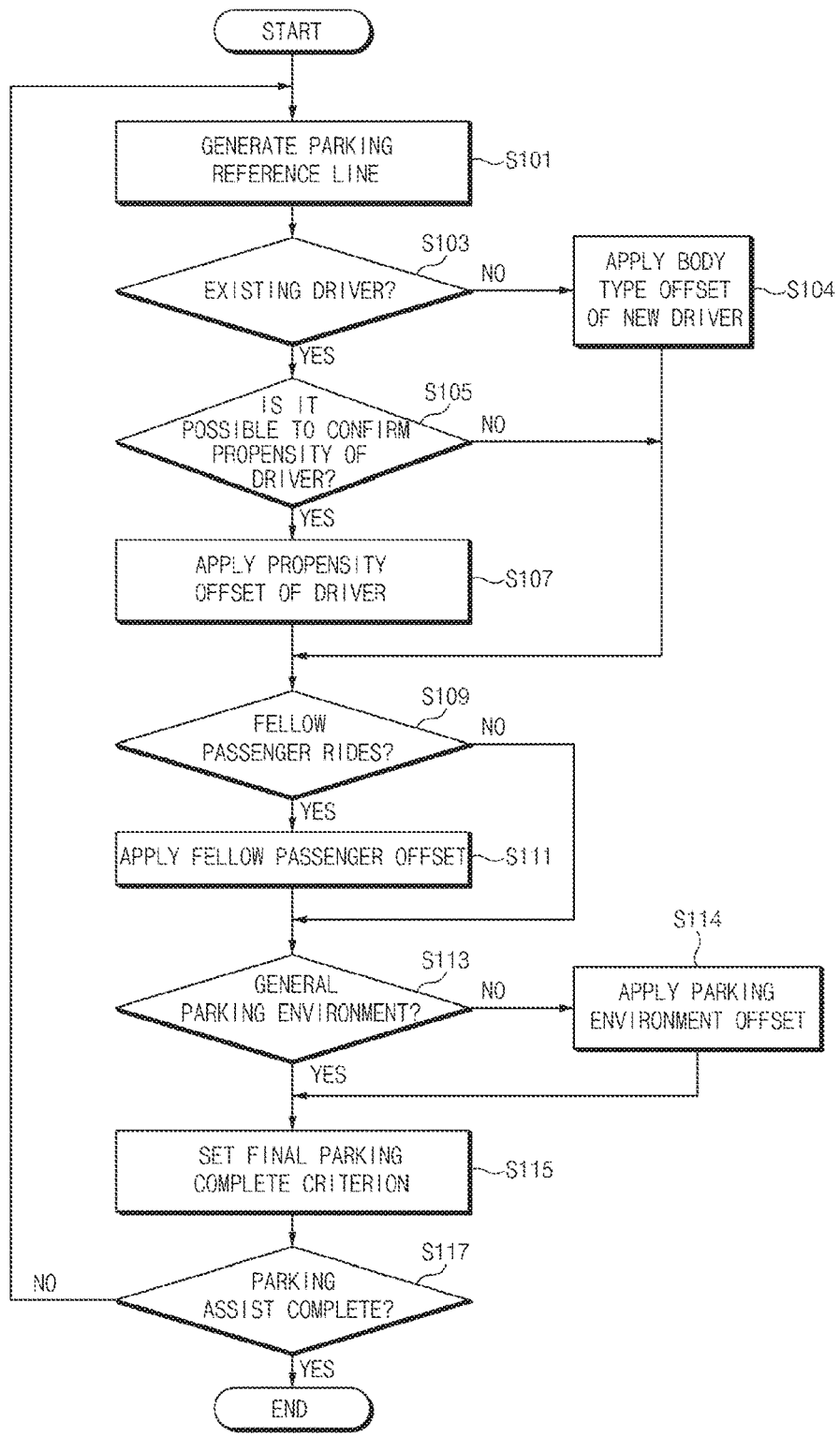
FIG. 3 is a flowchart illustrating a method for setting a parking complete criterion of a parking assist system according to an exemplary embodiment of the present disclosure.

FIG. 3 is a flowchart illustrating a method for setting a parking complete criterion of a parking assist system according to an exemplary embodiment of the present disclosure.

As illustrated in FIG. 3, if the parking assist function is performed, the controller 180 may generate the parking reference line based on the default parking complete criterion (S101). The controller 180 may search the parking slot using the parking slot searcher 110 and generate the parking reference line in the searched parking slot. Here, the controller 180 may set a center line of the parking slot searched by the same method as that in an existing parking assist system as the parking reference line. The default parking complete criterion may also be a parking complete criterion for a previous driver.

The controller 180 may confirm whether or not the driver who currently rides in the driver seat is the existing driver (S103). That is, the controller 180 may confirm whether or not the driver is a driver experienced in previously driving the vehicle.

Meanwhile, in S103, if the current driver is not the existing driver, the controller 180 may confirm a body type of a new driver using the driver sensor 120 and apply a body type offset based on the body type of the new driver to the parking reference line of the default parking complete criterion (S104).

If the current driver is the existing driver, the controller 180 may confirm whether or not it is possible to confirm the propensity of the driver (S105). In other words, the controller 180 may confirm whether or not parking style information on the current driver exists in the storage 150.

The controller 180 may confirm the propensity of the current driver based on the parking style information of the driver and apply a propensity offset according to the propensity of the driver to an allowed parking alignment of the default parking complete criterion (S107).

After the controller 180 applies the propensity offset, the controller 180 may confirm whether or not a fellow passenger is riding using the fellow passenger sensor 130. Here, the controller 180 may obtain whether or not the fellow passenger is riding and a riding position of the fellow passenger as fellow passenger information using the fellow passenger sensor 130.

If the fellow passenger is riding, the controller 180 may apply the fellow passenger offset determined based on the fellow passenger information to the parking reference line and the allowed parking alignment of the default parking complete criterion (S111).

If the application of the fellow passenger offset is completed, the controller 180 may confirm a parking environment and may confirm whether or not the parking environment is a general parking environment (S113). The general parking environment may mean a parking slot according to a parking lot installation criterion and standard.

Meanwhile, in S113, if the parking environment is not the general parking environment, the controller 180 may apply the parking environment offset according to the parking environment information to the parking reference line and the allowed spaced distance of the default parking complete criterion (S114).

The controller 180 may determine the default parking complete criterion to which the body type and propensity information of the driver, and the parking environment information are reflected, as a final parking complete criterion (S115). That is, the controller 180 may set a driver customized parking complete criterion obtained by taking account of the parking style of the driver.

The controller 180 may confirm whether or not the parking assist is completed based on the set final parking complete criterion (S117). That is, the controller 180 may determine whether or not the parking is completed based on the final parking complete criterion.

In S117, if the parking assist is completed, the controller 180 may inactivate the parking assist function.

Figure 4:
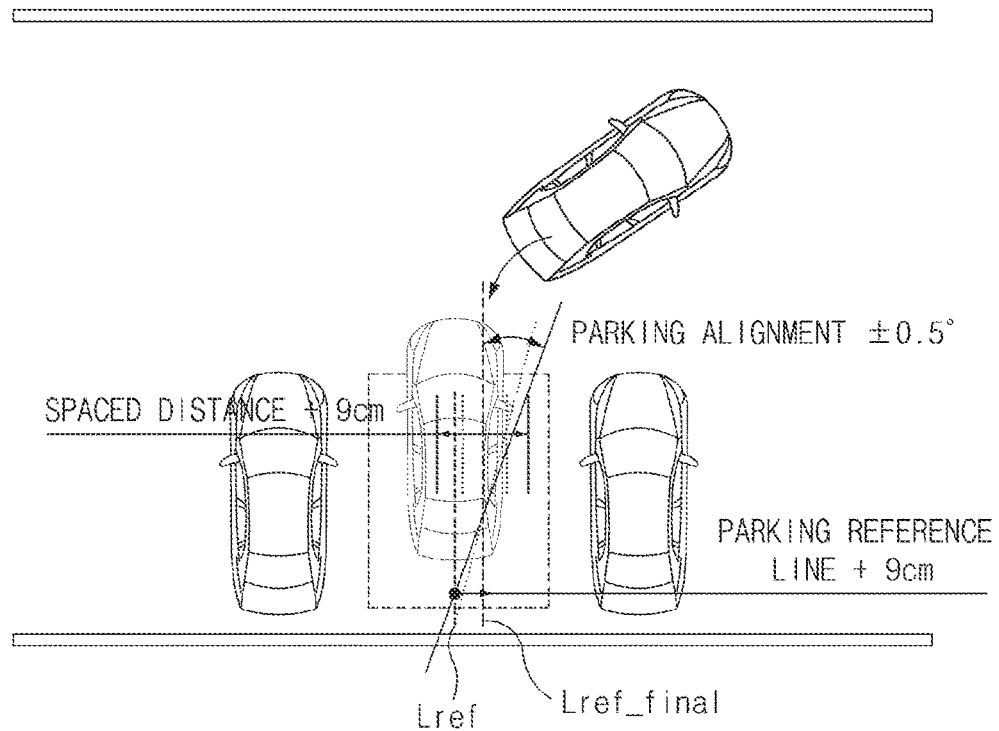
FIGS. 4 to 6 are illustrative diagrams illustrating examples in which the parking assist system according to the present disclosure sets the parking complete criterion.
Figure 5:
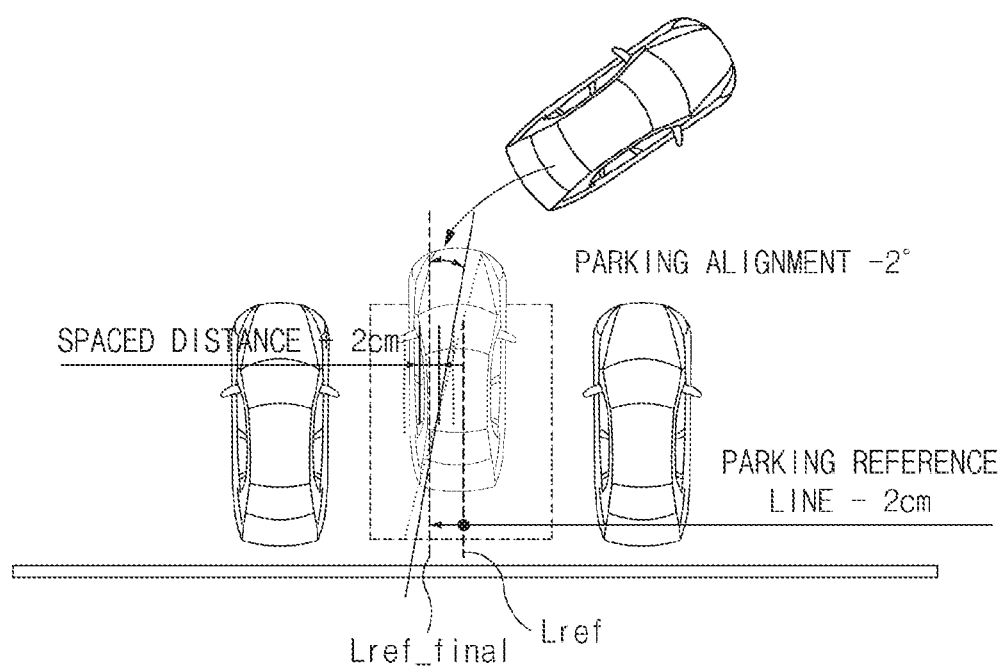
Figure 6:
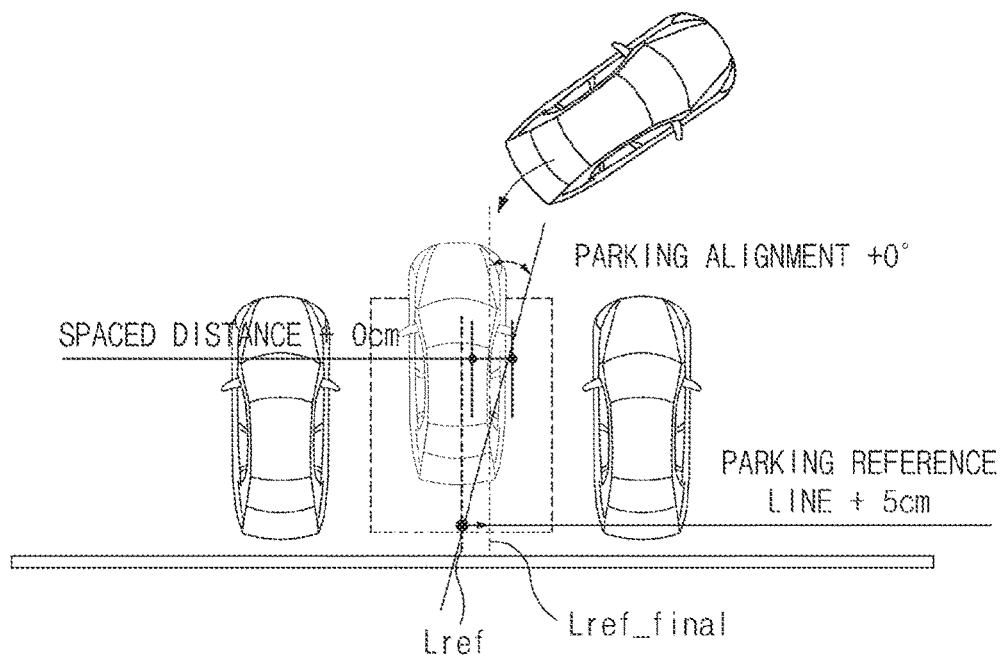

FIGS. 4 to 6 are illustrative diagrams illustrating examples in which the parking assist system according to the present disclosure sets the parking complete criterion.

It is assumed that an offset map as shown in Table 1 is stored in the storage 150 of the parking assist system.

TABLE 1

| Body Type | Propensity | Fellow Passenger | Parking Environment |
|---|---|---|---|
| Male Parking Reference Line +3 cm | Fast Parking Parking Alignment +1° | No Fellow Passenger Parking Reference Line +2 cm Parking Alignment +0.5° | Narrow Parking Slot Spaced Distance −2 cm |
| Female Parking Reference Line −1 cm | Accurate Parking Parking Alignment −1° | Fellow Passenger on Passenger Seat Parking Reference Line +0 cm Parking Alignment −0.5° | Broad Parking Slot Spaced Distance +2 cm |
| Slim Parking Reference Line +0 cm | Fast and Accurate Parking Parking Alignment +0° | Passenger on Rear Seat of Driver Seat Parking Reference Line +2 cm Parking Alignment +0° | General Parking Slot Spaced Distance +0 cm |
| Obesity Parking Reference Line +3 cm | Slow and Very Accurate Parking Parking Alignment −1.5° | Passenger on Rear Seat of Passenger Seat Parking Reference Line +0 cm Parking Alignment −0.5° | Parking Adjacent to Pillar (Driver Seat Side) Parking Reference Line +2 cm |
| Normal Parking Reference Line +0 cm | | | Parking Adjacent to Pillar (Fellow Passenger Seat Side) Parking Reference Line −2 cm |
| Tall Stature Parking | | | Parking Adjacent to Deep Pillar |

TABLE 1-continued

| Body Type | Propensity | Fellow Passenger | Parking Environment |
|---|---|---|---|
| Reference Line +3 cm | | | (Driver Seat/ Fellow Passenger Seat) Parking Alignment −0.5° |
| Short Stature Parking Reference Line −1 cm | | | |

First, according to the body type information and propensity information of the driver, the driver may be a tall and obese male and prefers fast parking. In addition, the fellow passenger is riding in the passenger seat, and the parking slot is broad.

In this case, the controller 180 may set a parking reference line offset (to which a driver body type offset and a fellow passenger offset are reflected) to +9 cm based on body type information of the driver and fellow passenger information. That is, the controller 180 may generate a final parking reference line Lref final by moving the parking reference line Lref generated by the default parking complete criterion as much as +9 cm as illustrated in FIG. 4.

In addition, since the propensity offset is +1° according to the propensity information of the driver and the fellow passenger offset is −0.5° based on the fellow passenger information, the controller 180 may set a final offset to +0.5°.

In other words, the controller 180 may set a parking alignment offset to +0.5°.

In addition, the controller 180 may apply the parking environment offset of +2 cm based on the parking environment to the allowed spaced distance.

As illustrated in FIG. 4, the final parking reference line of the final parking complete reference may be a parking reference line of Lref+9 cm, the parking alignment may be a parking alignment of x°+0.5°, and the spaced distance may be a spaced distance of α+2 cm.

Second, the driver may be a female of a slim body type and a short stature and prefers the slow and very accurate parking. The fellow passenger is riding in the rear seat of the passenger seat. In the case in which the parking slot is narrow, the final parking reference line may be set to a parking reference line of −2 cm obtained by reflecting the parking reference line offset of −2 cm, the parking alignment offset of −2°, and the spaced distance offset of −2 cm to the default parking complete criterion, the final parking alignment may be set to a parking alignment of −2°, and the final spaced distance may be set to −2 cm, respectively, as illustrated in FIG. 5.

Third, the driver may be a male having a normal weight and normal height and prefers the fast and accurate parking. There is no fellow passenger. The parking slot is a general parking slot according to the parking lot installation criterion and standard. In the case in which the vehicle is parked to be adjacent to the deep pillar, the final parking complete criterion may be a parking reference line of +5 cm, a parking alignment of +0°, and a spaced distance of +0 cm obtained by reflecting the parking reference line offset of +5 cm, the parking alignment offset of +0°, and the spaced distance offset of +0 cm to the default parking complete criterion, as illustrated in FIG. 6.

As described above, according to the exemplary embodiments of the present disclosure, since the driver customized parking complete criterion may be set by taking account of the parking style of the driver, the parking is performed with the parking style of the driver, thereby making it possible to improve convenience and satisfaction of the driver.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A parking assist system comprising:
    a parking space sensor for searching a parking space around a vehicle and obtaining parking environment information;
    a driver sensor for sensing a driver in the vehicle and obtaining driver information;
    a fellow passenger sensor for sensing a fellow passenger in the vehicle and obtaining fellow passenger information; and
    a controller for generating a parking reference line for the parking space based on a default parking complete criterion and reflecting an offset based on one or more of the parking environment information, the driver information and the fellow passenger information to the default parking complete criterion for changing a position of the parking reference line,
    wherein the driver sensor determines a parking style of the driver when the driver directly tries to park the vehicle and determines a parking pattern preferred by the driver according to the determined parking style, and
    wherein the controller sets the default parking complete criterion based on the determined parking pattern.

2. The parking assist system according to claim 1, wherein the parking space sensor includes one or more distance sensors installed at the front, the rear, and the side of the vehicle, respectively.

3. The parking assist system according to claim 1, wherein the parking environment information includes any one or more of an area and width of the parking space, whether or not there is a pillar and an interval between neighboring parked vehicles.

4. The parking assist system according to claim 1, wherein the driver sensor includes any one or more of a pressure sensor, a driver seat position sensor, a steering wheel position sensor and an image sensor.

5. The parking assist system according to claim 1, wherein the driver information includes:
    body type information including gender, weight and height of the driver, and
    propensity information including the parking pattern preferred by the driver.

6. The parking assist system according to claim 1, wherein the fellow passenger sensor includes any one or more of a pressure sensor, a sensor sensing whether or not a hot wire is operated, and a sensor sensing whether or not a ventilation sheet is operated.

7. The parking assist system according to claim 1, wherein the fellow passenger information includes whether or not a fellow passenger is riding and a riding position of the fellow passenger.

8. The parking assist system according to claim 1, wherein the controller sets a final parking complete criterion by reflecting a driver offset, a fellow passenger offset and a parking environment offset based on the driver information, the fellow passenger information and the parking environment information to the default parking complete criterion.

9. The parking assist system according to claim 8 wherein the default parking complete criterion includes the parking reference line, a parking alignment, and a spaced distance of the center of the vehicle from the parking reference line.

10. The parking assist system according to claim 9 wherein the driver offset includes a body type offset reflected to the parking reference line and a propensity offset reflected to the parking alignment.

11. The parking assist system according to claim 9 wherein the fellow passenger offset is reflected to the parking reference line and the parking alignment.

12. The parking assist system according to claim 9 wherein the parking environment offset is reflected to the parking reference line or the spaced distance.

13. A method for setting a parking complete criterion of a parking assist system, the method comprising steps of:
    generating, by a controller, a parking reference line for a parking space on which a vehicle is to be parked based on a default parking complete criterion at the time of executing a parking assist function;
    reflecting, by the controller, an offset based on any one or more of driver information, fellow passenger information and parking environment information obtained using a variety of sensors to the default parking complete criterion for changing a position of the parking reference line; and
    setting, by the controller, the default parking complete criterion to which the offset is reflected as a final parking complete criterion,
    wherein the step for reflecting of the offset includes:
        determining a parking style of the driver directly tires to park the vehicle when the driver directly tries to park the vehicle;
        determining a parking pattern preferred by the driver based on the determined parking style; and
        applying the offset according to the preferred parking pattern to the default parking complete criterion.

14. The method according to claim 13, further comprising determining whether or not a parking assist is completed according to the final parking complete criterion after the final parking complete criterion is set.

15. The method according to claim 13, wherein the step for reflecting of the offset includes:
    confirming whether or not a driver who rides the vehicle is an existing driver;
    if the riding driver is the existing driver, confirming whether or not it is possible to confirm a propensity of the driver; and
    reflecting a body type offset and a propensity offset based on the parking style of the driver to the default parking complete criterion.

16. The method according to claim 15, wherein in the step for confirming whether or not the driver is the existing driver, if the riding driver is not the existing driver, a body type of a new driver is confirmed and a body type offset thereof is determined.

17. The method according to claim 13, wherein in the step for reflecting of the offset, if the fellow passenger is in the vehicle, a fellow passenger offset based on the fellow passenger information is reflected to the default parking complete criterion.

18. The method according to claim 13, wherein in the step for reflecting of the offset, a parking environment offset based on the parking environment information of the parking space is reflected to the default parking complete criterion.

\* \* \* \* \*